US 9,621,832 B2

(12) United States Patent
Ogino et al.

(10) Patent No.: US 9,621,832 B2
(45) Date of Patent: Apr. 11, 2017

(54) SOLID-STATE IMAGE SENSOR AND CAMERA

(71) Applicant: CANON KABUSHIKI KAISHA, Tokyo (JP)

(72) Inventors: Masaya Ogino, Kawasaki (JP); Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/996,651

(22) Filed: Jan. 15, 2016

(65) Prior Publication Data

US 2016/0134825 A1  May 12, 2016

Related U.S. Application Data

(63) Continuation of application No. 13/090,380, filed on Apr. 20, 2011, now abandoned.

(30) Foreign Application Priority Data

May 10, 2010 (JP) .................................. 2010-108678

(51) Int. Cl.
  *H04N 5/3745* (2011.01)
  *H04N 5/359* (2011.01)
  (Continued)

(52) U.S. Cl.
  CPC ......... *H04N 5/3745* (2013.01); *H04N 5/3595* (2013.01); *H04N 5/3698* (2013.01);
  (Continued)

(58) Field of Classification Search
  None
  See application file for complete search history.

(56) References Cited

U.S. PATENT DOCUMENTS

| 6,897,429 B1 | 5/2005 | Turner et al. |
| 6,924,875 B2 | 8/2005 | Tomita |

(Continued)

FOREIGN PATENT DOCUMENTS

| CN | 1691759 | 11/2005 |
| CN | 101521756 | 9/2009 |

(Continued)

*Primary Examiner* — Roberto Velez
*Assistant Examiner* — Yih-Sien Kao
(74) *Attorney, Agent, or Firm* — Fitzpatrick, Cella, Harper & Scinto

(57) ABSTRACT

A solid-state image sensor comprises a pixel array in which a plurality of pixels are two-dimensionally arranged, and a plurality of column signal processing circuits which read out signals from the pixel array via a plurality of column signal lines arranged in correspondence with respective columns of the pixel array, wherein signals of the pixels of different colors in the pixel array are read out by the plurality of column signal processing circuits during a single period, and wherein at least the column signal processing circuits which process signals of the pixels of different colors, of the plurality of column signal processing circuits, are driven via conductive lines which are separated from each other in a region where at least the column signal processing circuits which process signals of the pixels of different colors are arranged.

8 Claims, 12 Drawing Sheets

(51) Int. Cl.
- *H04N 5/369* (2011.01)
- *H04N 5/374* (2011.01)
- *H04N 9/04* (2006.01)
- *H04N 5/376* (2011.01)
- *H04N 5/378* (2011.01)

(52) U.S. Cl.
CPC ........... *H04N 5/378* (2013.01); *H04N 5/3742* (2013.01); *H04N 5/3765* (2013.01); *H04N 9/045* (2013.01)

(56) References Cited

U.S. PATENT DOCUMENTS

| | | | |
|---|---|---|---|
| 7,547,871 | B2 | 6/2009 | Hiyama et al. |
| 7,696,773 | B2 | 4/2010 | Levey |
| 7,791,034 | B2 | 9/2010 | Kameshima et al. |
| 7,880,786 | B2 | 2/2011 | Muramatsu |
| 8,059,179 | B2 | 11/2011 | Nakano et al. |
| 8,072,514 | B2 | 12/2011 | Takenaka et al. |
| 2004/0155281 | A1 | 8/2004 | Osada et al. |
| 2005/0237408 | A1* | 10/2005 | Muramatsu ............ H04N 3/15 348/308 |
| 2006/0186315 | A1 | 8/2006 | Lee et al. |
| 2007/0064129 | A1 | 3/2007 | Suzuki |
| 2009/0219428 | A1 | 9/2009 | Nakano et al. |
| 2011/0013067 | A1 | 1/2011 | Yamashita |
| 2011/0242351 | A1 | 10/2011 | Shoji |
| 2014/0285697 | A1 | 9/2014 | Nitta et al. |

FOREIGN PATENT DOCUMENTS

| | | |
|---|---|---|
| JP | H01-196982 | 8/1989 |
| JP | 2003-258228 | 9/2003 |
| JP | 2004-172267 | 6/2004 |
| JP | 2005-278135 | 10/2005 |
| JP | 2005-311821 | 11/2005 |
| JP | 2005-312081 | 11/2005 |
| JP | 2007-082063 | 3/2007 |
| JP | 2007-300183 | 11/2007 |

\* cited by examiner

SOLID-STATE IMAGE SENSOR AND CAMERA

This application is a continuation of application Ser. No. 13/090,380 filed Apr. 20, 2011.

BACKGROUND OF THE INVENTION

Field of the Invention

The present invention relates to a solid-state image sensor and a camera including the same.

Description of the Related Art

Cameras such as digital cameras and digital camcorders incorporate a solid-state image sensor such as a CMOS image sensor on which a plurality of photoelectric conversion sections are two-dimensionally arranged. The solid-state image sensor is required to have a steady high frame rate to cope with a high continuous shooting speed (the number of images to be captured per sec) and a high-resolution movie capture. Japanese Patent Laid-Open No. 2005-311821 discloses a solid-state image sensor in which a plurality of column read lines are arranged for each column of a pixel array, so as to improve the frame rate of the solid-state image sensor.

In an arrangement in which pixel signals of a plurality of colors are read out during a single period, a potential change of a column signal line often influences other column signal lines via a power supply line used to drive a column signal processing circuit or a signal line used to control the column signal processing circuit. As a result, mixture of colors may occur since the pixel signals of the plurality of colors influence each other.

SUMMARY OF THE INVENTION

The present invention provides a technique which is effective to reduce mixture of colors in the arrangement in which pixel signals of a plurality of colors are read out during a single period.

The first aspect of the present invention provides a solid-state image sensor comprising a pixel array in which a plurality of pixels are two-dimensionally arranged, and a plurality of column signal processing circuits which read out signals from the pixel array via a plurality of column signal lines arranged in correspondence with respective columns of the pixel array, wherein signals of the pixels of different colors in the pixel array are read out by the plurality of column signal processing circuits during a single period, and wherein at least the column signal processing circuits which process signals of the pixels of different colors, of the plurality of column signal processing circuits, are driven via conductive lines which are separated from each other in a region where at least the column signal processing circuits which process signals of the pixels of different colors are arranged.

The second aspect of the present invention provides a camera comprising the above solid-state image sensor, and a processing section which processes signals output from the solid-state image sensor.

Further features of the present invention will become apparent from the following description of exemplary embodiments with reference to the attached drawings.

DESCRIPTION OF THE EMBODIMENTS

Figure 1:
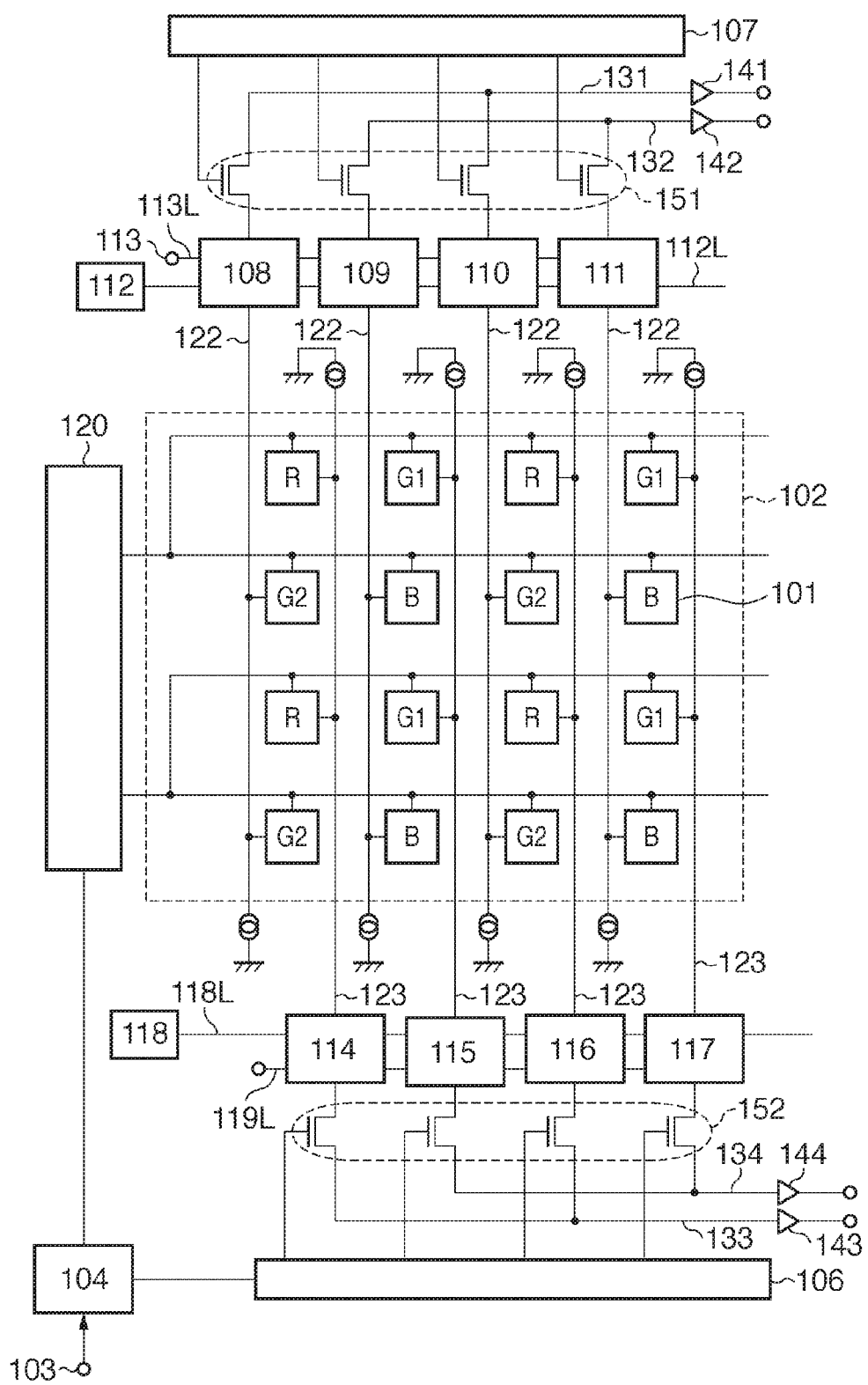
FIG. 1 is a block diagram showing an example of the arrangement of a solid-state image sensor.

The aforementioned problem of mixture of colors will be explained first by looking at some practical examples. FIG. 1 is a block diagram showing an example of the arrangement of a solid-state image sensor. A pixel array 102 is configured by arranging a plurality of pixel sections 101 in two-dimension. Each pixel can include, for example, a photoelectric conversion element, a floating diffusion (to be abbreviated as FD hereinafter), a transfer switch which transfers a charge generated and accumulated by the photoelectric conversion element to the FD, and an amplifier section which outputs a signal according to the charge transferred to the FD to a column signal line 122 or 123. Each pixel can further include a reset section which resets a potential of the FD, and a selection section. A method of omitting the selection section, and selecting a row by controlling the FD potential is also available.

On respective pixels, for example, in a primary color filter system, any of R, G1, G2, and B color filters are arranged according to an arrangement such as a Bayer arrangement. Pixels on which the R, G1, G2, and B color filters are arranged can be respectively called an R pixel, G1 pixel, G2 pixel, and B pixel. The R pixel is a red pixel, the G1 and G2 pixels are green pixels, and the B pixel is a blue pixel. The G1 and G2 pixels are those having the same color (both pixels may be called G pixels), and the R, G, and B pixels are those having different colors. Note that the problem to be described below may occur when signals are read out from different color pixels via a column signal line during a single period even in a complementary color filter system and other systems. Also, the problem to be described below may occur not only in a MOS image sensor but also in other solid-state image sensors such as a CCD image sensor. The present invention is applicable to other solid-state image sensors such as a CCD image sensor in addition to the MOS image sensor.

A row of the pixel array 102 is selected by a row selecting circuit (vertical scanning circuit) 120, and columns of the pixel array 102 are selected by column selecting circuits (horizontal scanning circuits) 106 and 107. The row selecting circuit 120 and the column selecting circuits 106 and 107 operate according to timing signals which are generated by a timing control circuit 104 based on clocks 103. Signals of pixels of a column selected by the column selecting circuit 107 are read out by a column signal processing circuit of that column, and are output via a switch 151, horizontal signal lines 131 and 132, and output amplifiers 141 and 142. Signals of pixels of a column selected by the column selecting circuit 106 are read out by a column signal processing circuit of that column, and are output via a switch 152, horizontal signal lines 133 and 134, and output amplifiers 143 and 144.

To the pixel array 102, a plurality of column signal lines 122 and 123 are connected, so that two column signal lines 122 and 123 are connected to each column. The plurality of column signal lines 122 are connected to column signal processing circuits 108 to 111 arranged on one side of the pixel array 102. The plurality of column signal lines 123 are connected to column signal processing circuits 114 to 117 arranged on the other side of the pixel array 102. The column signal processing circuits 108 to 111 read out signals from the G2 and B pixels via the plurality of column signal lines 122 during a single period. The column signal processing circuits 114 to 117 read out signals from the R and G1 pixels via the plurality of column signal lines 123 during a single period. In this example, the column signal processing circuits 108 to 111 arranged on one side of the pixel array 102 read out signals from the pixels of the two different colors during a single period. Also, in this example, the column signal processing circuits 114 to 117 arranged on the other side of the pixel array 102 read out signals from the pixels of the two different colors during a single period. Typically, the column signal processing circuits 108 to 111 and 114 to 117 are controlled to read out signals from the pixels during a single period, and the signals can be read out from the pixels of all the colors during the single period. In this way, when the two column signal lines are connected to each column, signals of the pixels having the different colors are read out during the single period, and the same applies to a case in which three or more column signal lines are connected to each column. That is, when a plurality of column signal lines are connected to each column, signals of pixels having different colors are read out during the single period.

To the column signal processing circuits 108 to 111, a power supply voltage is supplied from a power supply section 112 via a power supply line 112L, and a control signal 113 is supplied via a control line 113L. The column signal processing circuits 108 to 111 read out signals from the G2 and B pixels, that is, those having the different colors during the single period. For this reason, when a signal which appears on an arbitrary column signal line 122 has a large amplitude, it may influence signals which appear on other column signal lines 122 via the power supply line 112L and control line 113L. To the column signal processing circuits 114 to 117, a power supply voltage is supplied from a power supply section 118 via a power supply line 118L, and a control signal 119 is supplied via a control line 119L. The column signal processing circuits 114 to 117 read out signals from the R and G1 pixels, that is, those having the different colors during the single period. For this reason, when a signal which appears on an arbitrary column signal line 123 has a large amplitude, it may influence signals which appear on other column signal lines 123 via the power supply line 118L and control line 119L.

Figure 2:
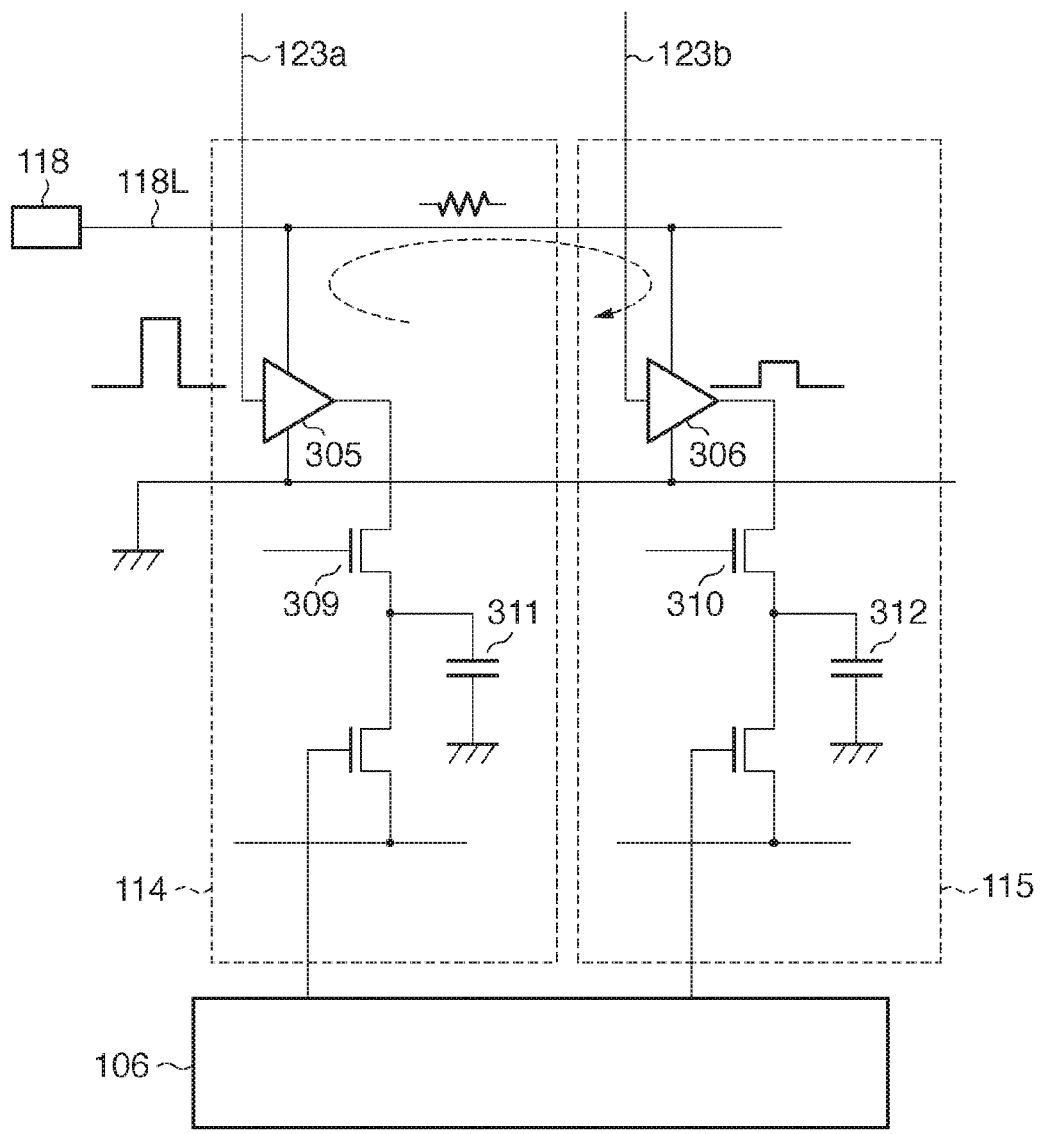
FIG. 2 is a diagram for explaining the reason why mixture of colors occurs via a power supply line.

The reason why mixture of colors occurs via a power supply line will be described below with reference to FIG. 2. In order to distinguish the two column signal lines 123, those which are connected to the column signal processing circuits 114 and 115 will be referred to as column signal lines 123a and 123b hereinafter. When a signal having a large intensity is input to an amplifier circuit 305 of the column signal processing circuit 114 via the column signal line 123a, a potential of the power supply line 118L may vary. At this time, an amplifier circuit 306 of the column signal processing circuit 115, to which a signal is input via the column signal line 123b, is influenced by the potential variation on the power supply line 118L. Therefore, a signal output from the amplifier circuit 306 is influenced by the potential variation on the power supply line 118L. That is, signals of a plurality of colors are read out by the column signal processing circuits using the common power supply line during a single period, thus causing mixture of colors. As a result, the resolution and color reproducibility deteriorate. Note that the influence of the variation of the power supply voltage of the power supply line may appear between pixels of the same color, but an image quality drop due to that variation is smaller than that caused by mixture of colors between pixels of the different colors.

Figure 3:
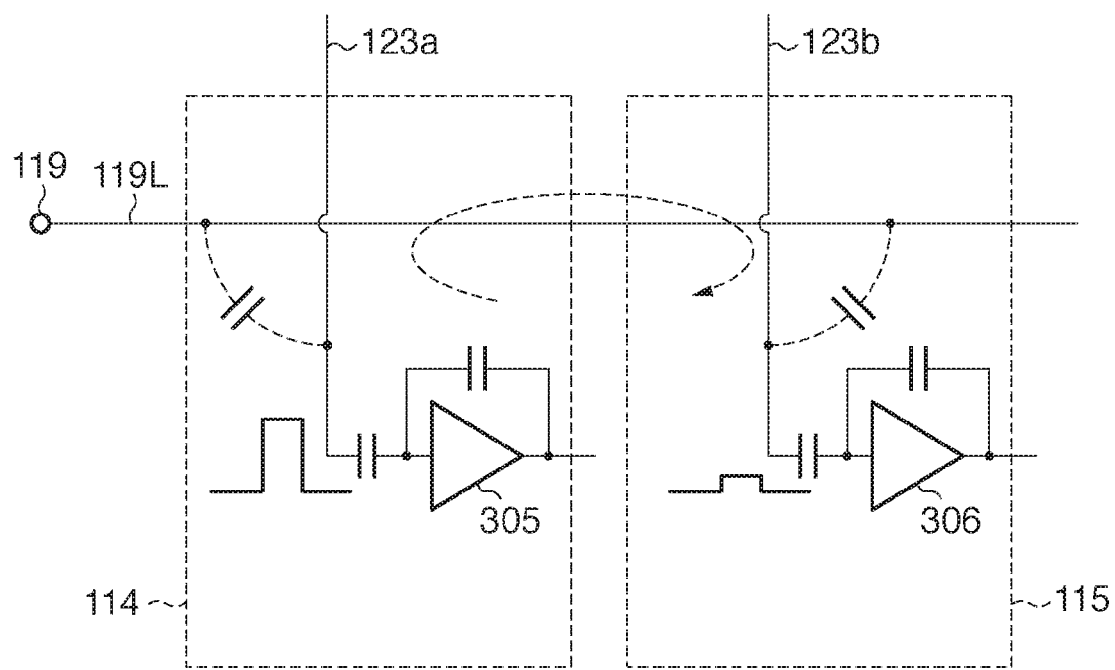
FIG. 3 is a diagram for explaining the reason why mixture of colors occurs via a control line.

The reason why mixture of colors occurs via a control line will be described below with reference to FIG. 3. A case will be examined below wherein a signal having a large intensity is input to the amplifier circuit 305 of the column signal processing circuit 114 via the column signal line 123a. In this case, the potential of the control line 119L may vary due to capacitive coupling between the column signal line 123a (or a signal line whose potential varies according to the potential variation of the column signal line 123a) and the control line 119L. At this time, the column signal line 123b (or the amplifier circuit 306 of the column signal processing circuit 115 to which a signal is input via the column signal line 123b) is influenced by the potential variation of the control line 119L. Therefore, a signal output from the amplifier circuit 306 is influenced by the potential variation of the control signal 119L. That is, signals of a plurality of colors are read out by the column signal processing circuits using the common control line during a single period, thus causing mixture of colors. As a result, the resolution and color reproducibility deteriorate.

To summarize the above description, signals of a plurality of colors are read out by the column signal processing circuits using a common conductive line (for example, the power supply line or control line) during a single period, thus causing mixture of colors.

By changing the arrangement of color filters, combinations of colors of pixels whose signals are to be read out during a single period can be changed. For example, when color filters of the same color are arranged on neighboring pixels, the pixels to be read out during the single period can have the same color. In this case, mixture of colors can be reduced since the respective colors have different read periods. However, with the arrangement in which the color filters of the neighboring pixels have the same color, high resolution cannot be obtained compared to a case in which they have different colors.

Upon occurrence of mixture of colors, when a signal intensity of a pixel of interest is large, a signal value of a pixel which suffers that influence often becomes higher than a correct signal value. However, depending on a transient response state and read timing, that signal value often becomes lower than the correct signal value.

Figure 4:
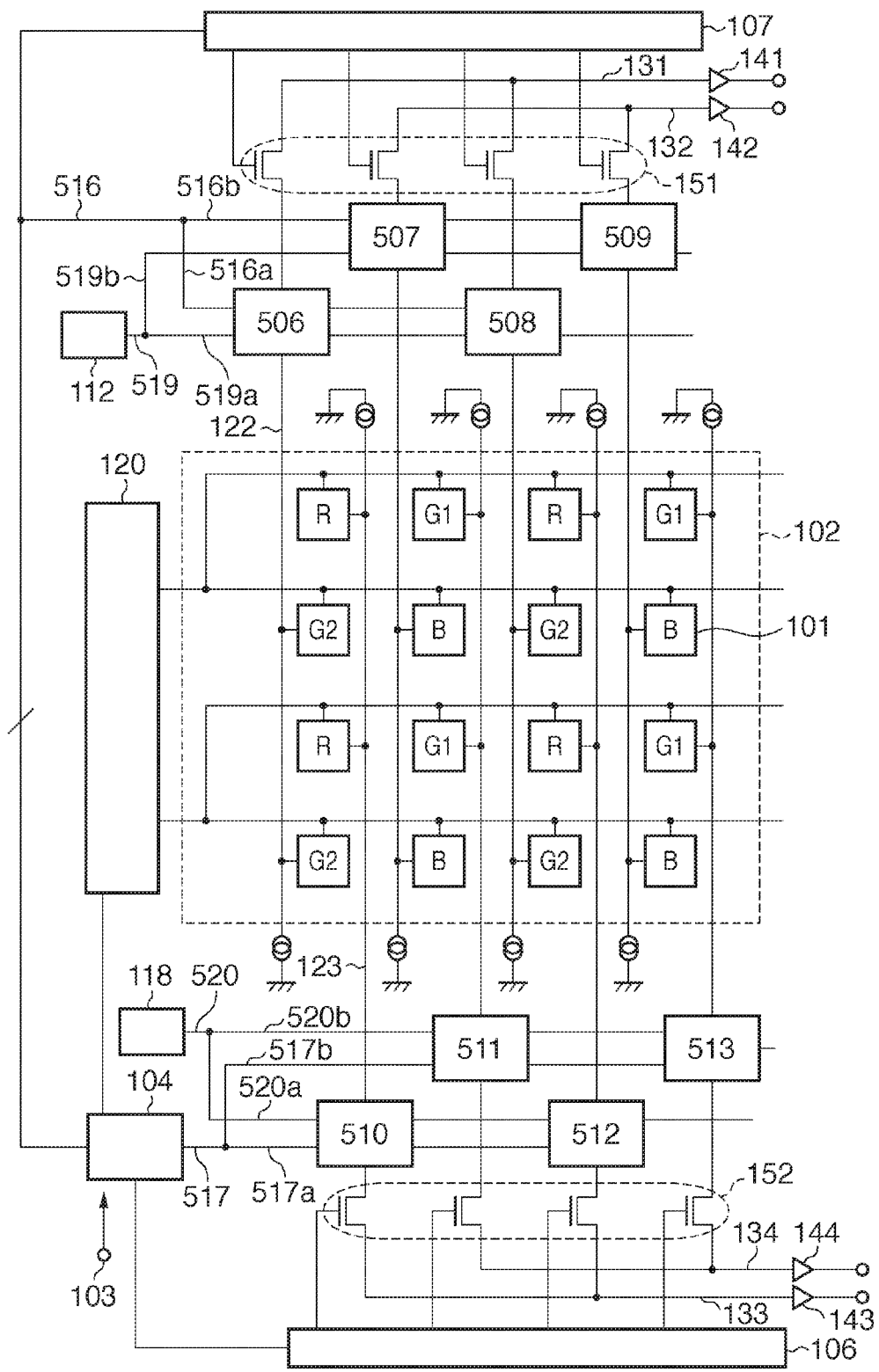
FIG. 4 is a block diagram showing the arrangement of a solid-state image sensor according to the first embodiment of the present invention.

Embodiments of the present invention will be described hereinafter. FIG. 4 is a block diagram showing the arrangement of a solid-state image sensor according to the first embodiment of the present invention. The same reference numerals in FIG. 4 denote the same parts as in FIG. 1. Note that pixel sections 101 are arranged in 4 rows×4 columns in a pixel array 102 in FIG. 4. However, this arrangement is for the purpose of descriptive convenience, and in general more pixel sections 101 are arranged. In the embodiment shown in FIG. 4, at least column signal processing circuits which process signals of pixels of different colors of a plurality of column signal processing circuits are driven via separated conductive lines. More specifically, at least the column signal processing circuits which process signals of pixels of different colors of the plurality of column signal processing circuits are supplied with power supply voltages via separated conductive lines (power supply lines), and are supplied with control signals of the same logic level via separated conductive lines (control lines). In this case, at least the column signal processing circuits which process signals of pixels of the same color of the plurality of column signal processing circuits may also be supplied with power supply voltages via separated power supply lines, and may also be supplied with control signals of the same logic level via separated control lines.

A power supply line 519 as one conductive line connected to a power supply section 112 is branched into power supply lines 519a and 519b as conductive lines outside a region where column signal processing circuits 506 to 509 as supply destinations (or driving targets) of a power supply voltage are arranged. Therefore, the power supply line 519 is separated into the power supply lines 519a and 519b within the region where the column signal processing circuits 506 to 509 as the supply destinations of a power supply voltage are arranged. A power supply line 520 as one conductive line connected to a power supply section 118 is branched into power supply lines 520a and 520b as conductive lines outside a region where column signal processing circuits 510 to 513 as supply destinations (or driving targets) of a power supply voltage are arranged. Hence, the power supply line 520 is separated into the power supply lines 520a and 520b within the region where the column signal processing circuits 510 to 513 as the supply destinations of a power supply voltage are arranged.

A control line 516 as one conductive line connected to a timing control circuit 104 is branched into control lines 516a and 516b as conductive lines outside a region where the column signal processing circuits 506 to 509 as supply destinations (or driving targets) of a control signal are arranged. Hence, the control line 516 is separated into the control lines 516a and 516b within the region where the column signal processing circuits 506 to 509 as the supply destinations of a control signal are arranged. A control line 517 as one conductive line connected to a timing control circuit 104 is branched into control lines 517a and 517b as conductive lines outside a region where the column signal processing circuits 510 to 513 as supply destinations (or driving targets) of a control signal are arranged. Hence, the control line 517 is separated into the control lines 517a and 517b within the region where the column signal processing circuits 510 to 513 as the supply destinations of a control signal are arranged. Note that the power supply sections 112 and 118 may be interface circuits (power supply circuits) such as voltage conversion circuits which convert an externally supplied voltage, or may be a power supply pad of the solid-state image sensor configured as a chip. In this case, the power supply pad is an example of a pad which is driven by the solid-state image sensor or an external circuit of the chip (external power supply circuit).

In the first embodiment, the column signal processing circuits 506 and 508 which process signals of G2 pixels are supplied with a power supply voltage via the power supply line 519a, and are supplied with column signal processing pulses as an example of a control signal via the control line 516a. The column signal processing circuits 507 and 509 which process signals of B pixels are supplied with a power supply voltage via the power supply line 519b, and are supplied with column signal processing pulses as an example of a control signal via the control line 516b. The column signal processing circuits 510 and 512 which process signals of R pixels are supplied with a power supply voltage via the power supply line 520a, and are supplied with column signal processing pulses as an example of a control signal via the control line 517a. The column signal processing circuits 511 and 513 which process signals of G1 pixels are supplied with a power supply voltage via the power supply line 520b, and are supplied with column signal processing pulses as an example of a control signal via the control line 517b. The power supply lines 519a, 519b, 520a, and 520b are those which are separated from each other, and the control lines 516a, 516b, 517a, and 517b are those which are separated from each other. In this case, the G1 and G2 pixels are those of the same color. However, in the first embodiment, the power supply line 520b and control line 517b connected to the column signal processing circuits 511 and 513 which process signals of the G1 pixels are different from the power supply line 519a and control line 516a connected to the column signal processing circuits 506 and 508 which process signals of the G2 pixels.

In the embodiment shown in FIG. 4, at least the signal processing circuits which process signals of pixels of different colors of the plurality of signal processing circuits are supplied with power supply voltages via the separated power supply lines, and are supplied with control signals of the same logic level via the separated control lines. However, when at least the signal processing circuits which process signals of pixels of different colors of the plurality of signal processing circuits are supplied with only power supply voltages via the separated power supply lines, the problem of mixture of colors is reduced. Also, when at least the signal processing circuits which process signals of pixels of different colors of the plurality of signal processing circuits are supplied with only control signals of the same logic level via the separated control lines, the problem of mixture of colors is reduced. Hence, the signal processing circuits which process signals of pixels of different colors of the plurality of signal processing circuits need only be supplied with power supply voltages via the separated power supply lines. Alternatively, the signal processing circuits which process signals of pixels of different colors of the plurality of signal processing circuits need only be supplied with control signals of the same logic level via the separated control lines.

Figure 5:
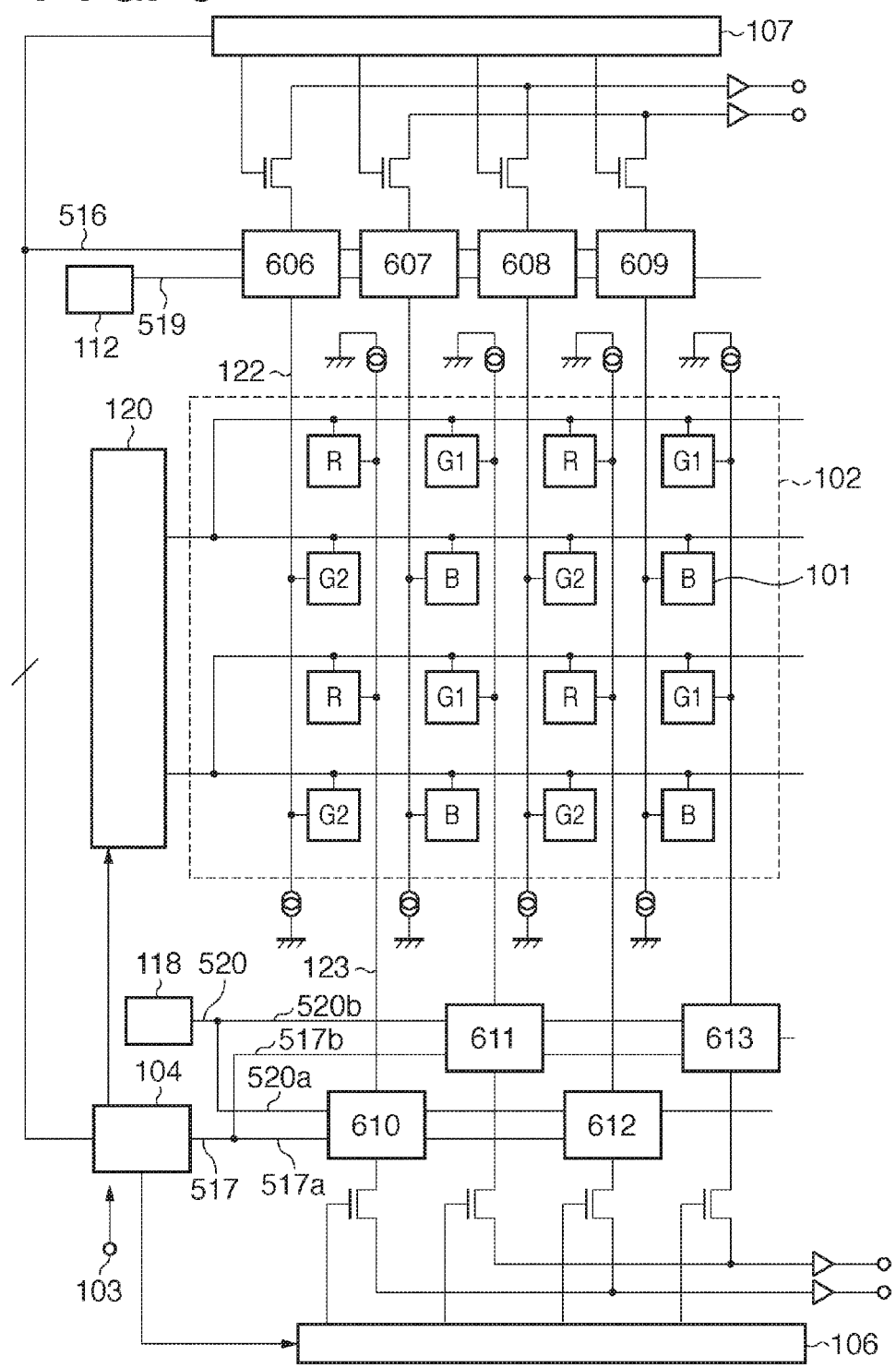
FIG. 5 is a block diagram showing the arrangement of a solid-state image sensor according to the second embodiment of the present invention.

FIG. 5 is a block diagram showing the arrangement of a solid-state image sensor according to the second embodiment of the present invention. In the second embodiment, signals of G1 and G2 pixels are read out by column signal processing circuits 606 to 609 which are arranged in the same direction when viewed from a pixel array 102. In this case as well, the column signal processing circuits 606 to 609 which read out signals of the G1 and G2 pixels may be driven via conductive lines which are separated from each other. That is, separated power supply lines and/or separated control lines may be provided to the column signal processing circuits 606 to 609 which read out signals of the G1 and G2 pixels. However, since the G1 and G2 pixels have the same color, mutual influences between the G1 and G2 pixels are smaller than mixture of colors between different colors.

Figure 6:
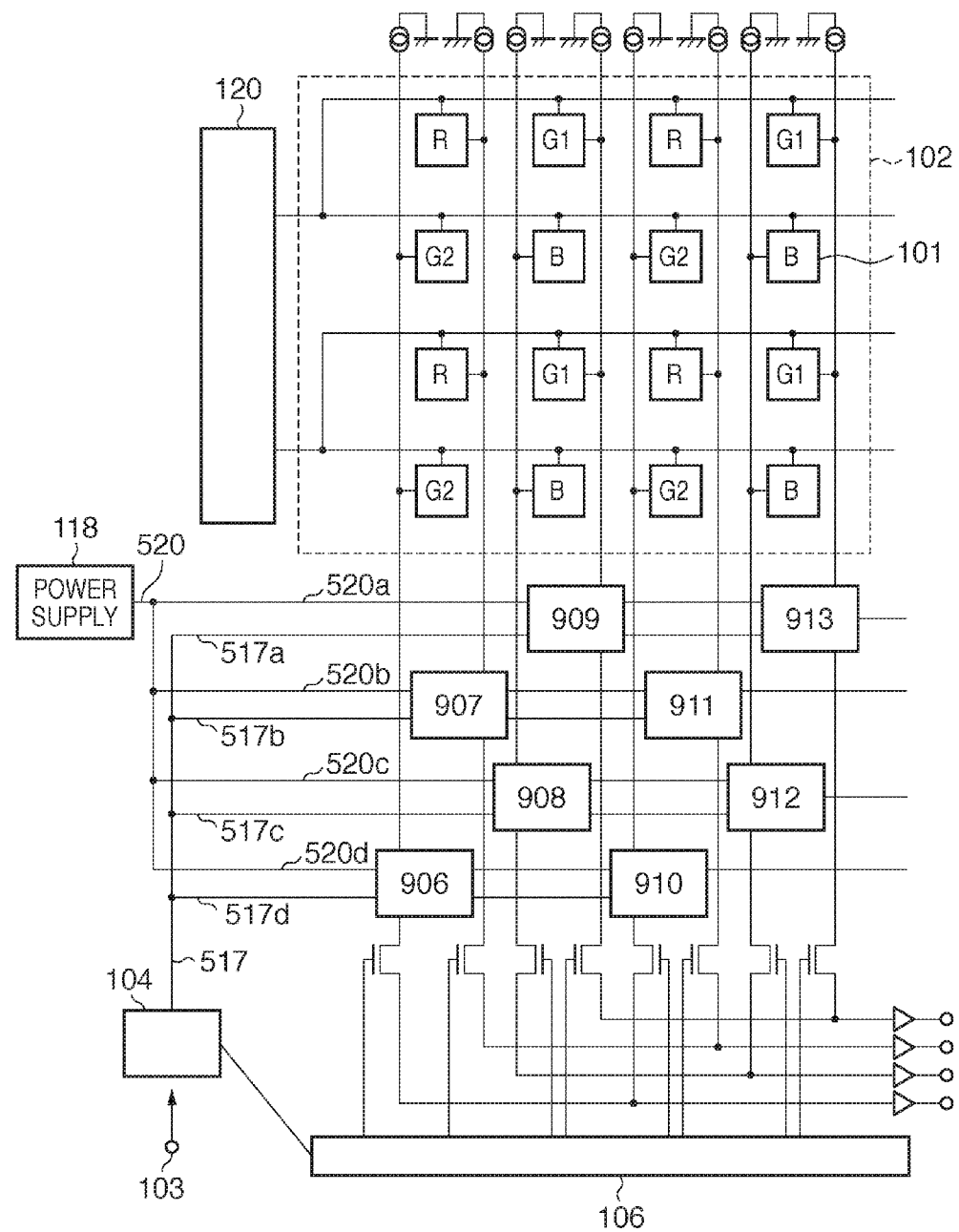
FIG. 6 is a block diagram showing the arrangement of a solid-state image sensor according to the third embodiment of the present invention.

FIG. 6 is a block diagram showing the arrangement of a solid-state image sensor according to the third embodiment of the present invention. In the third embodiment, all column signal processing circuits 906 to 913 are arranged in the same direction when viewed from a pixel array 102. In the third embodiment as well, at least signal processing circuits which process signals of pixels of different colors of a plurality of signal processing circuits are driven via conductive lines which are separated from each other. That is, in the third embodiment as well, at least the signal processing circuits which process signals of pixels of different colors of the plurality of signal processing circuits are supplied with power supply voltages via separated power supply lines, and are supplied with control signals of the same logic level via separated control lines. In this case, at least the signal processing circuits which process signals of pixels of different colors of the plurality of signal processing circuits need only be supplied with power supply voltages via the separated power supply lines. Alternatively, at least the signal processing circuits which process signals of pixels of different colors of the plurality of signal processing circuits need only be supplied with control signals (column signal processing pulses) of the same logic level via the separated control lines.

A power supply line 520 connected to a power supply section 118 is separated into power supply lines 520a to 520d outside a region where the column signal processing circuits 906 to 913 as supply destinations of a power supply voltage are arranged. A control line 517 connected to a timing control circuit 104 is separated into control lines 517a to 517d outside the region where the column signal processing circuits 906 to 913 as supply destinations of a control signal are arranged.

When the arrangement positions of neighboring column signal processing circuits are shifted in the column direction as in the first and third embodiments, the arrangement design of the column signal processing circuits is facilitated even when the arrangement pitch of the pixel sections 101 is reduced.

A chip layout of the solid-state image sensor of each of the first to third embodiments will be exemplified below with reference to FIG. 7. In the example shown in FIG. 7, the power supply sections 112 and 118 are configured as a power supply pad 70 of the solid-state image sensor configured as a chip 700. The chip 700 may include other circuits (for example, a memory and logic circuit) in addition to the solid-state image sensor. The power supply line 519 is connected to the power supply pad 70 via an interface circuit (power supply circuit) such as a voltage conversion circuit or directly. The power supply line 519 is branched (separated) into the power supply lines 519a and 519b outside a region where a column signal processing block 710 as a supply destination of a power supply voltage is arranged. The power supply line 520 connected to the power supply pad 70 is branched (separated) into the power supply lines 520a and 520b outside a region where a column signal processing block 720 as a supply destination of a power supply voltage is arranged. In this case, the power supply lines 519 and 520 may be connected to different power supply pads via interface circuits (power supply circuits) such as voltage conversion circuits or directly.

The column signal processing block 710 is configured by a plurality of column signal processing circuits (the column signal processing circuits 506 to 509 in the first embodiment). Also, the column signal processing block 710 includes first and second regions 710A and 710B. The first region 710A is closer to the pixel array 102 than the second region 710B. In other words, the first region 710A is arranged between the pixel array 102 and second region 710B. In the first region 710A, first column signal processing circuits which read out signals of pixels of the same color (the column signal processing circuits 506 and 508 in the first embodiment) are arranged. In the second region 710B, second column signal processing circuits which read out signals of pixels of the same color (the column signal processing circuits 507 and 509 in the first embodiment) are arranged. The first column signal processing circuits arranged in the first region 710A and the second column signal processing circuits arranged in the second region 710B read out signals of pixels of different colors.

Likewise, the column signal processing block 720 is configured by a plurality of column signal processing circuits (the column signal processing circuits 510 to 513 in the first embodiment). The column signal processing block 720 includes first and second regions 720A and 720B. The first region 720A is closer to the pixel array 102 than the second region 720B. In other words, the first region 720A is arranged between the pixel array 102 and second region 720B. In the first region 720A, first column signal processing circuits which read out signals of pixels of the same color (the column signal processing circuits 511 and 513 in the first embodiment) are arranged. In the second region 720B, second column signal processing circuits which read out signals of pixels of the same color (the column signal processing circuits 510 and 512 in the first embodiment) are arranged. The first column signal processing circuits arranged in the first region 720A and the second column signal processing circuits arranged in the second region 720B read out signals of pixels of different colors.

The control line 516 connected to the timing control circuit 104 is branched (separated) into the control lines 516a and 516b outside the region where the column signal processing block 710 as a supply destination of a control signal is arranged. The control line 517 connected to the timing control circuit 104 is branched (separated) into the control lines 517a and 517b outside the region where the column signal processing block 720 as a supply destination of a control signal is arranged.

Figure 8:
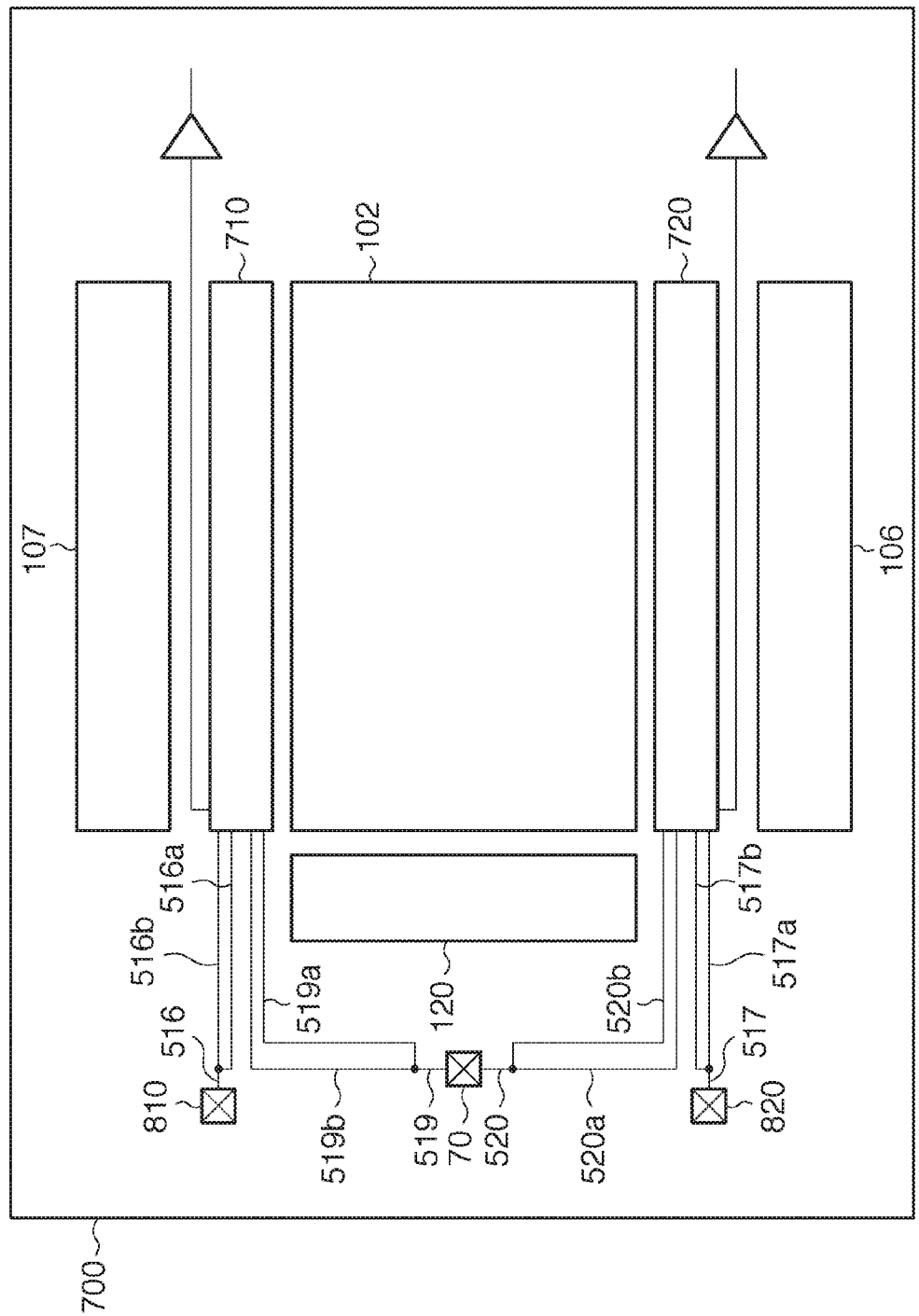
FIG. 8 is a view for explaining a modification of the solid-state image sensor of each of the first to third embodiments.

A modification of the solid-state image sensor according to each of the first to third embodiments will be described below with reference to FIG. 8. In this modification, a circuit corresponding to the timing control circuit 104 is arranged as an external circuit outside the solid-state image sensor configured as the chip 700. The chip 700 has input pads 810 and 820, and control signals are supplied from the external circuit to the input pads 810 and 820. In this case, the input pad is an example of a pad which is driven by the solid-state image sensor or an external circuit of the chip. The control line 516 is connected to the input pad 810 via an interface circuit such as an input circuit or directly. The control line 516 is branched (separated) into the control lines 516a and 516b outside the region where the column signal processing block 710 as the supply destination of a control signal is arranged. The control line 517 is connected to the input pad 820 via an interface circuit such as an input circuit or directly. The control line 517 is branched (separated) into the control lines 517a and 517b outside the region where the column signal processing block 720 as the supply destination of a control signal is arranged.

Figure 9:
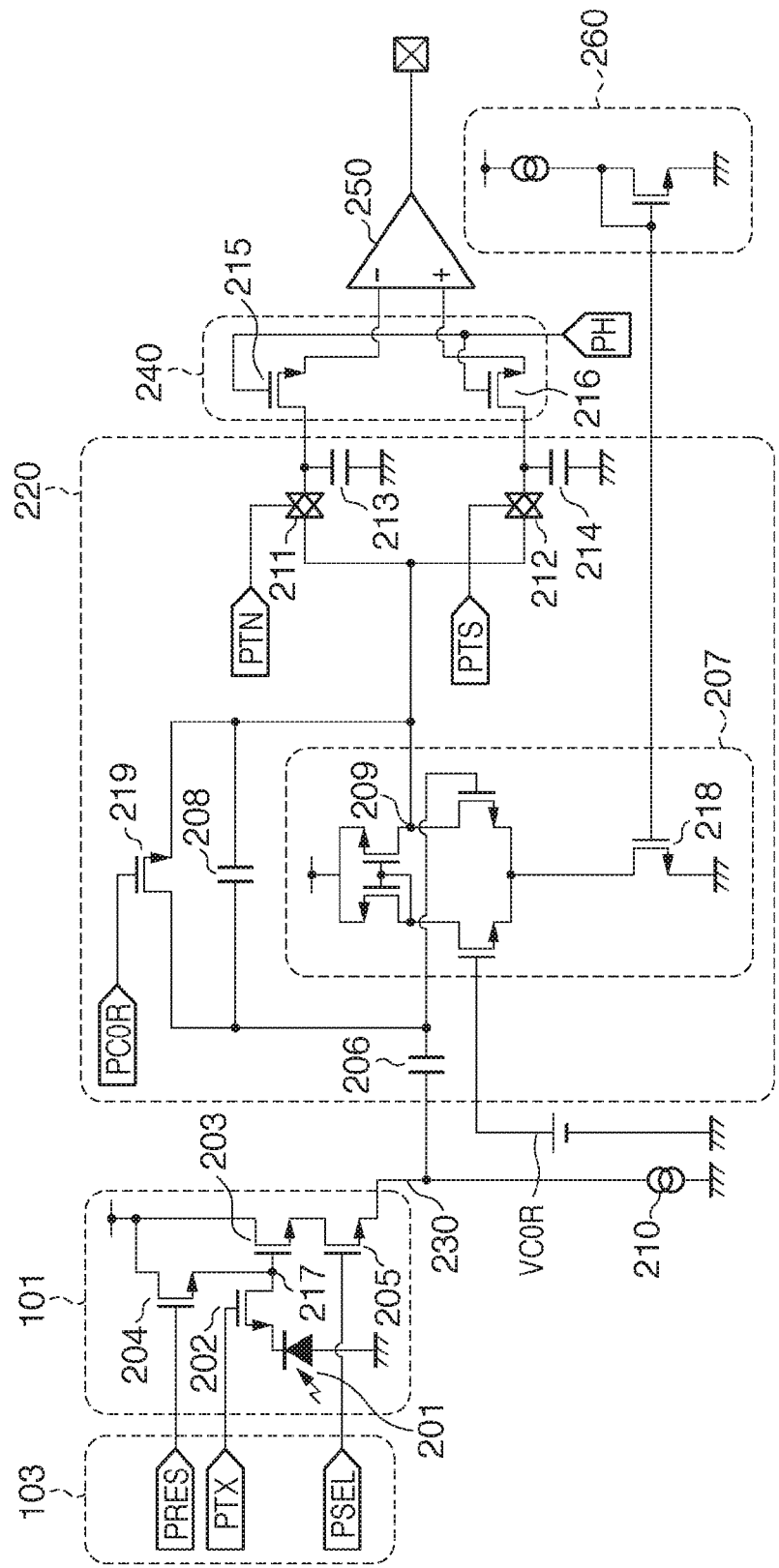
FIG. 9 is a circuit diagram for explaining an example of the practical circuit arrangement and operation of the solid-state image sensor of each of the first to third embodiments.

The practical circuit arrangement and operation of the solid-state image sensor according to each of the first to third embodiments will be described below with reference to FIGS. 9 and 10. A column signal processing circuit 220 corresponds to the column signal processing circuits 506 to 509 and the like (the first embodiment). A column signal line 230 corresponds to the column signal lines 122 and 123. A switch section 240 corresponds to the switches 151 and 152. An output amplifier 250 corresponds to the output amplifiers 141 to 144.

The pixel section 101 includes, for example, a photoelectric conversion element 201, transfer transistor 202, floating diffusion (to be abbreviated as FD hereinafter) 217, reset transistor 204, source-follower transistor 203, and selecting transistor 205. The photoelectric conversion element 201 can be, for example, a photodiode. The transfer transistor 202 transfers a charge generated by photoelectric conversion in the photoelectric conversion element 201 to the FD 217 when a transfer pulse PTX goes to active level. The FD 217 converts the charge into a potential. The reset transistor 204 resets the potential of the FD 217 when a reset pulse PRES goes to active level. The source-follower transistor 203 amplifies the potential of the FD 217. The selecting transistor 205 sets the pixel section 101 including that selecting transistor 205 in a selected state when a selecting pulse PSEL goes to active level. In the selected state, a signal of the pixel section 101 is output onto the column signal line 230.

The column signal line 230 is connected to a current source 210 which configures a source-follower circuit together with the source-follower transistor 203, and a clamp capacitor 206 of the column signal processing circuit 220. The column signal processing circuit 220 is a circuit which processes a signal output from the pixel section 101 via the column signal line 230 and, more specifically, a circuit which reads out a signal from the pixel section 101 via the column signal line 230. The column signal processing circuit 220 includes a column amplifier circuit configured by the clamp capacitor 206, a differential amplifier 207, feedback capacitor 208, and switch 219. The differential amplifier 207 is supplied with a power supply voltage via a power supply line (for example, one of the aforementioned power supply lines 519a, 519b, 520a, and 520b).

An output terminal 209 and one input terminal of the differential amplifier 207 are connected via the switch 219. The other input terminal of the differential amplifier 207 is connected to a reference voltage VC0R. The output terminal 209 of the differential amplifier 207 (column amplifier circuit) is connected to holding capacitors 213 and 214 via switches 211 and 212. A gate electrode of a constant current transistor 218 which controls a consumption current of the differential amplifier 207 is connected to a current control section 260. When a column selecting pulse PH driven by the column selecting circuits 106 and 107 goes to active level, signals held by the holding capacitors 213 and 214 are supplied to the output amplifier 250 via switches 215 and 216, which are enabled by the active column selecting pulse PH, and are differentially amplified. Control signals supplied to the column signal processing circuit via the aforementioned control lines 516 and 517 can be, for example, pulse signals such as a clamp pulse PC0R, PTN pulse, and PTS pulse which respectively control the switches 219, 211, and 212.

Figure 10:
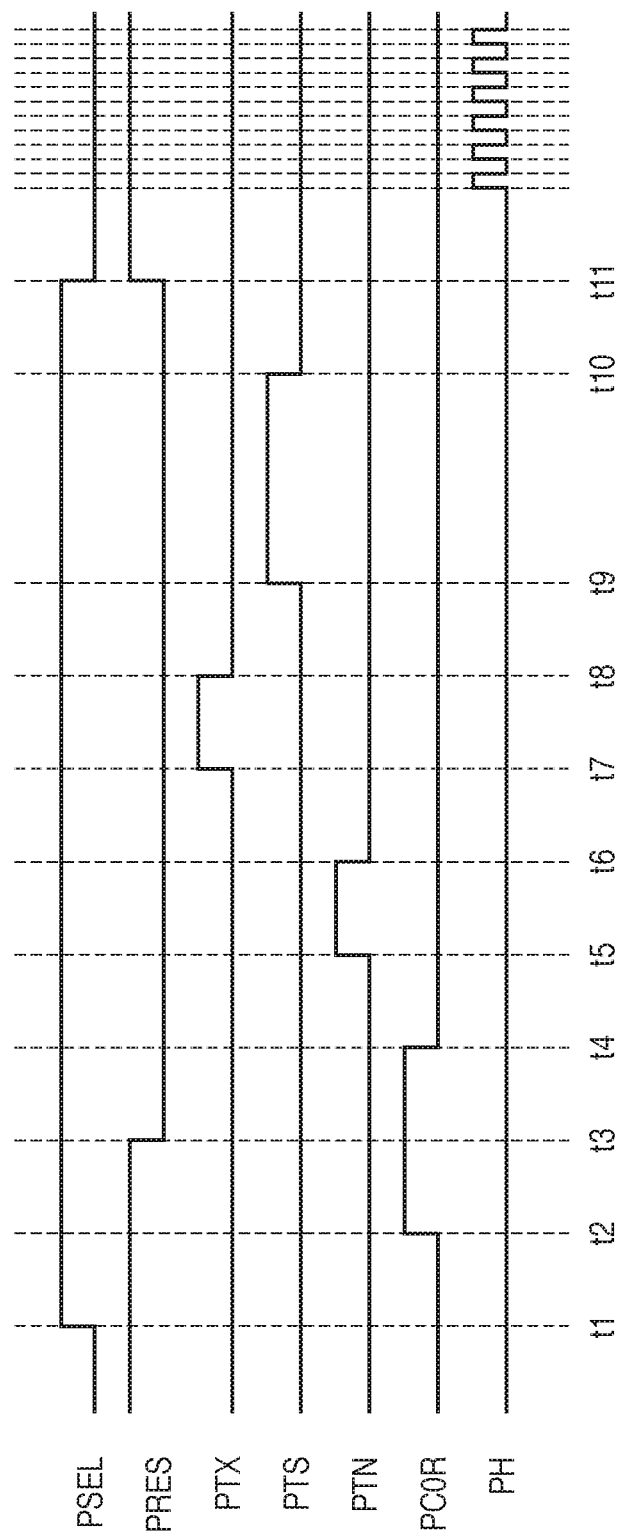
FIG. 10 is a timing chart for explaining an example of the practical circuit arrangement and operation of the solid-state image sensor of each of the first to third embodiments.

In FIG. 10, at T=t1, the selecting pulse PSEL goes to high level (active level), and the source-follower transistor 203 is set in an active state. In this state, the reset pulse PRES is at high level (active level), and the FD 217 is reset to a reset voltage by the reset transistor 204. At T=t2, the clamp pulse PC0R goes to high level, and the differential amplifier 207 is set in a buffer state, that is, a state in which it outputs the reference voltage VC0R.

At T=t3, since the reset pulse PRES goes to low level, the reset transistor 204 is disabled. In this state, the potential of the column signal line 230 is a reference potential VN corresponding to the potential of the reset FD 217. At T=t4, the clamp pulse PC0R goes to low level, and the reference potential VN on the column signal line 230 is clamped. At T=t5 and t6, since the PTN pulse goes to high level to enable the switch 211, a sum of the reference voltage VC0R and an offset voltage of the differential amplifier 207 is written in the holding capacitor 213.

At T=t7 and t8, the transfer pulse PTX goes to high level (active level) to enable the transfer transistor 202, and a charge accumulated on the photoelectric conversion element 201 is transferred to the FD 217. Then, the potential of the column signal line 230 changes to a voltage VS according to the charge transferred to the FD 217. At T=t9 and t10, the PTS pulse goes to high level to enable the switch 212, and an output voltage of the column amplifier circuit including the differential amplifier 207 is written in the holding capacitor 214. In this case, when a signal charge of the pixel section 101 is given by electrons, VS<VN. The output voltage of the column amplifier circuit amounts to a sum of a voltage which is obtained by inversely amplifying a voltage change amount (VS−VN) by a gain determined by C0/Cf, and a voltage which is obtained by adding the offset voltage of the differential amplifier 207 to the reference voltage VC0R. Note that C0 is the capacitance of the clamp capacitor 206, and Cf is that of the feedback capacitor 208.

At T=t11, when the reset pulse PRES goes to high level and the selecting pulse goes to low level, the FD 217 is reset by the reset transistor 204, and the pixel selection 101 is set in an unselected state.

After that, at T=t12, the signals held in the holding capacitors 213 and 214 are supplied to the output amplifier 250 via the switches 215 and 216 of the switch section 240 according to the column selecting pulse driven by the column selecting circuits 106 and 107, and are differentially amplified.

Figure 11:
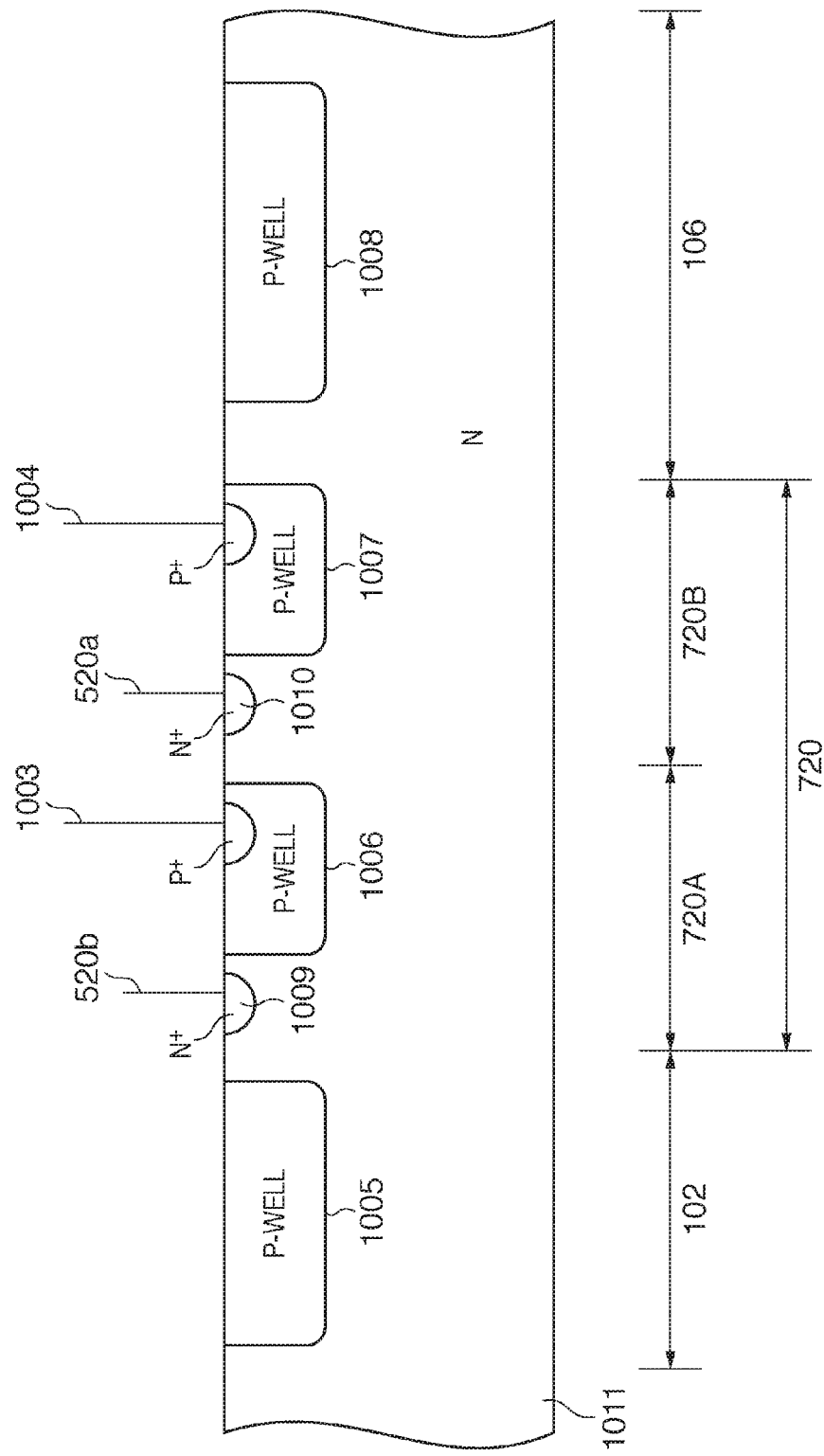
FIG. 11 a sectional view for explaining an example of the sectional structure of the solid-state image sensor.

The present invention has the advantage of reducing mixture of colors irrespective of a conductivity type of a semiconductor substrate or those of wells, and can obtain more conspicuous effects by devising the arrangement of circuit elements and the sectional structure. FIG. 11 is a sectional view illustrating an example of the sectional structure taken along A-A' in FIG. 7. In the example shown in FIG. 11, P-wells 1005, 1006, 1007, and 1008 are arranged in an N-type semiconductor substrate 1011. The pixel array 102 is arranged in the P-well 1005. In the P-well (first P-well) 1006, MOS transistors of the column signal processing circuits in the first region 720A are formed, and the P-well 1006 is grounded via a ground line 1003. In the P-well (second P-well) 1007, MOS transistors of the column signal processing circuits in the second region 720B are formed, and the P-well 1007 is grounded via a ground line 1004. The P-wells 1006 and 1007 are isolated from each other. In the P-well 1008, the column selecting circuit 106 is arranged. The column signal processing circuits in the first region 720A are supplied with a power supply voltage via the power supply line 520b. The power supply line 520b is arranged on an $N^+$-region 1009 arranged between the P-wells 1005 and 1006, and is connected to the $N^+$-region 1009. The column signal processing circuits in the second region 720B are supplied with a power supply voltage via the power supply line 520a. The power supply line 520a is arranged on an N+-region 1010 arranged between the P-wells 1006 and 1007, and is connected to the N+-region 1010.

As exemplified in FIG. 11, upon adopting a structure in which the P-wells 1006 and 1007 where the column signal processing circuits that process signals of pixels of different colors are formed are isolated, electron mobility between the P-wells 1006 and 1007 is suppressed by the N-type semiconductor substrate 1011. This is advantageous in reduction of mixture of colors. Furthermore, the N+-regions 1009 and 1010 and the power supply lines 520b and 520a, which are arranged between the P-wells 1005, 1006, and 1007, have an effect of ejecting neighboring electrons outside the N-type semiconductor substrate 1011. They are also advantageous in reduction of mixture of colors.

Figure 7:
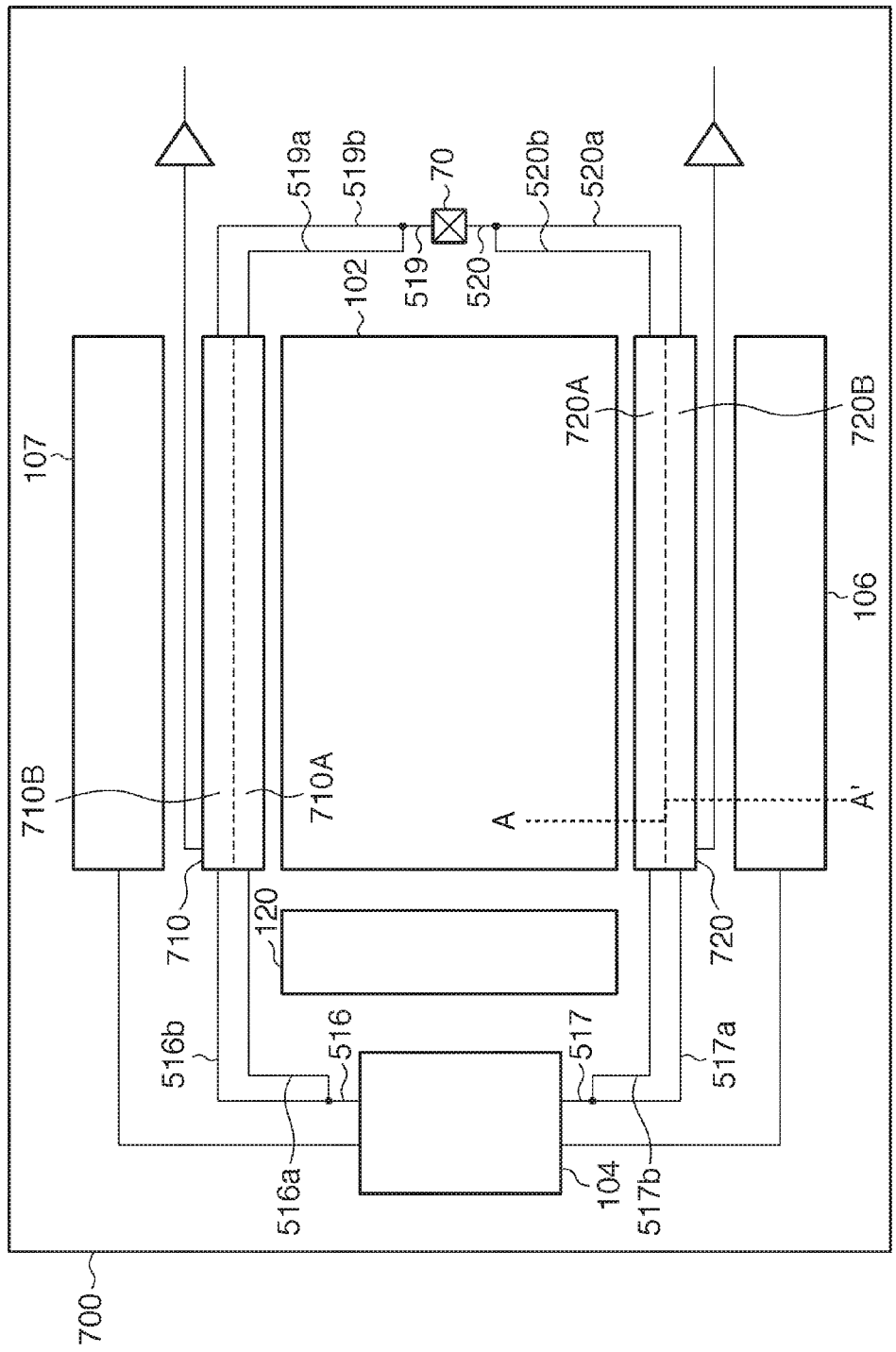
FIG. 7 is a view for explaining an example of a chip layout of the solid-state image sensor of each of the first to third embodiments.
Figure 12:
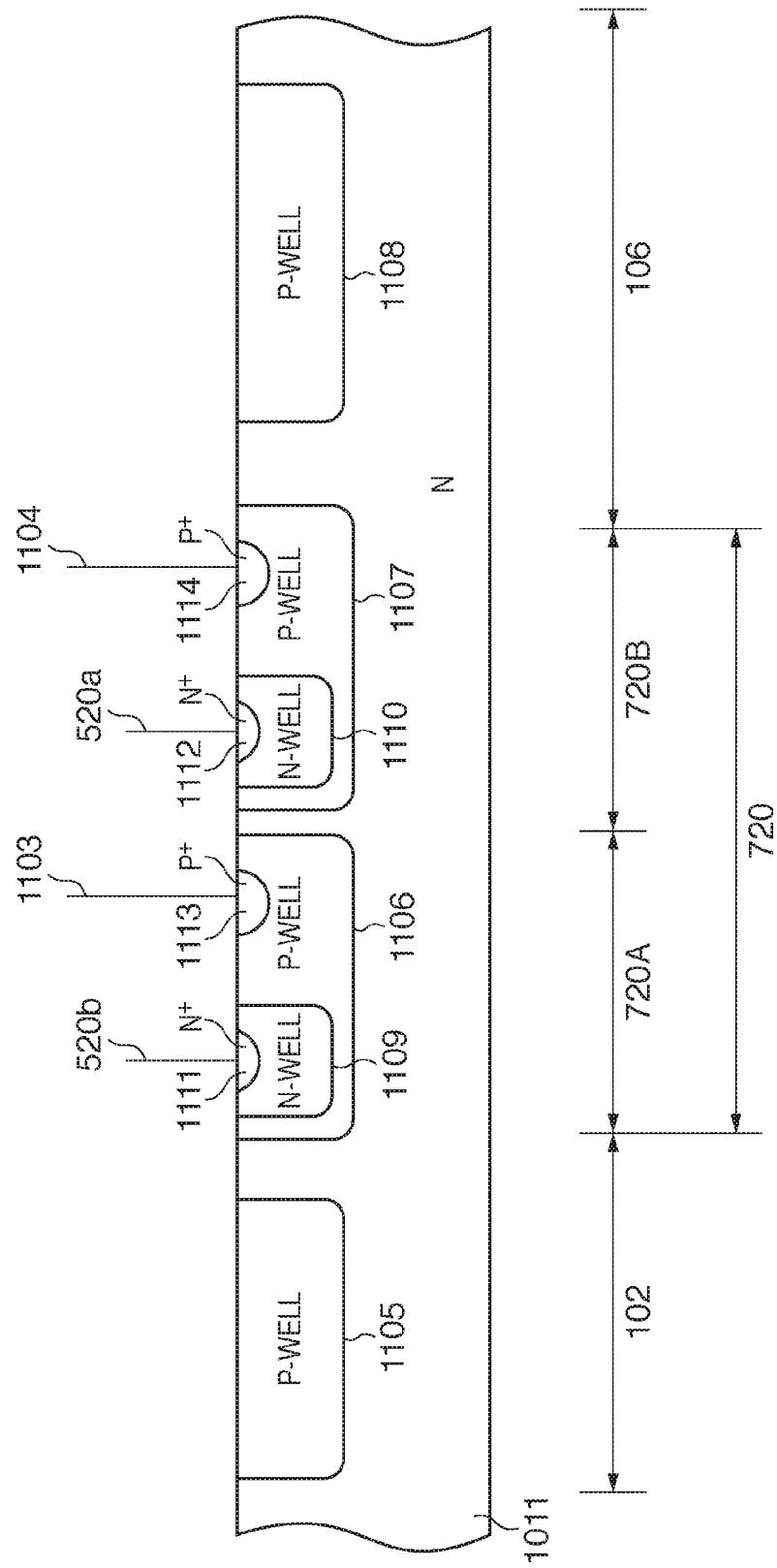
FIG. 12 a sectional view for explaining an example of the sectional structure of the solid-state image sensor.

FIG. 12 is a sectional view illustrating another example of the sectional structure taken along A-A' in FIG. 7. The example shown in FIG. 12 adopts a so-called "triple-well structure". P-wells 1105, 1106, 1107, and 1108 are arranged in the N-type semiconductor substrate 1011. In the P-well 1105, the pixel array 102 is arranged. In the P-well (first P-well) 1106, the MOS transistors of the column signal processing circuits in the first region 720A are formed. In the P-well (second P-well) 1107, the MOS transistors of the column signal processing circuits in the second region 720B are formed. In the P-well 1108, the column selecting circuit 106 is arranged. The P-wells 1106 and 1107 are isolated from each other.

In the P-well 1106, a P+-region 1113, which is connected to a ground line 1103, is arranged, and the P-well 1106 is grounded by this region. An N-well 1109 is further arranged in the P-well 1106, and an N+-region 1111, which is connected to the power supply line 520b, is arranged in the N-well 1109. In the P-well 1107, a P+-region 1114, which is connected to a ground line 1104, is arranged, and the P-well 1107 is grounded by this region. An N-well 1110 is further arranged in the P-well 1107, and an N+-region 1112, which is connected to the power supply line 520a, is arranged in the N-well 1110.

According to the structure exemplified in FIG. 12, electrons generated in the P-wells 1106 and 1107 are more likely to be ejected outside the N-type semiconductor substrate 1101 via the power supply lines 520b and 520a. Therefore, the possibility of occurrence of mixture of colors between the P-wells 1106 and 1107 is more reduced.

When the present invention is applied to a CMOS image sensor, the same effects can be obtained not only for an obverse surface incidence type image sensor, which is popularly used, but also for a reverse surface incidence type image sensor. In the reverse surface irradiation type, since a semiconductor substrate is generally as thin as several microns, generated electrons are not diffused in a deep region of the substrate, but they float near the surface, thus readily causing mixture of colors. Therefore, a reduction of the mixture of colors can be obtained more notably.

As an application example of the solid-state image sensor according to each of the above embodiments, a camera which incorporates the solid-state image sensor will be exemplified below. The concept of a camera includes not only an apparatus which mainly aims at image capturing but also an apparatus which accessorily includes an image capturing function (for example, a personal computer and mobile phone). The camera includes the solid-state image sensor according to the present invention exemplified as the aforementioned embodiments, and a processing section which processes signals output from the solid-state image sensor. The processing section can include, for example, an A/D converter, and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-108678, filed May 10, 2010, which is hereby incorporated by reference herein in its entirety.

What is claimed is:

1. A solid-state image sensor comprising a pixel array in which a plurality of pixels are two-dimensionally arranged, and a plurality of column signal processing circuits which are arranged on one side of the pixel signal array and process signals from the pixel array via a plurality of column signal lines, the plurality of column signal lines extending parallel to a first direction, the plurality of column signal processing circuits including first column signal processing circuits configured to process signals from pixels of a first color and second column signal processing circuits configured to process signals from pixels of a second color different from the first color, the first column signal processing circuits being arranged parallel to a second direction which is different from the first direction, the second column signal processing circuits being arranged parallel to the second direction,
wherein signals of the pixels of different colors in the pixel array are processed by the first column signal processing circuits and the second column signal processing circuits during a same period,
wherein the sensor further comprises a first conductive line extending in the second direction, and a second conductive line extending in the second direction and separated from the first conductive line, the first conductive line being configured to supply a first voltage to the first column signal processing circuits, and the second conductive line being configured to supply a second voltage to the second column signal processing circuits, and
wherein a position of the first column signal processing circuits in the first direction is different from a position of the second column signal processing circuits in the first direction.

2. The solid-state image sensor according to claim 1, wherein the first column signal processing circuits and the second column signal processing circuits are supplied respectively with a first control signal and a second control signal via a first control line and a second control line, the first and second control signals having a same logic level, the first and second control lines being separated from each other in a region where the plurality of column signal processing circuits are arranged.

3. The solid-state image sensor according to claim 1, wherein the first and second conductive lines are connected to a pad driven directly by an external apparatus of the solid-state image sensor or via an interface circuit.

4. The solid-state image sensor according to claim 1, wherein one power supply line is branched into the first and second conductive lines at a position outside a region where the plurality of column signal processing circuits are arranged.

5. The solid-state image sensor according to claim 4, wherein the one power supply line is connected to a pad driven directly by an external apparatus of the solid-state image sensor or via an interface circuit.

6. The solid-state image sensor according to claim 1, wherein the first column signal processing circuits are arranged in a first P-well of an N-type semiconductor substrate and the second column signal processing circuits are arranged in a second P-well of the N-type semiconductor substrate, the first P-well and the second P-well are positioned separately from each other.

7. The solid-state image sensor according to claim 1, wherein the first column signal processing circuits are arranged in a first P-well of an N-type semiconductor substrate and the second column signal processing circuits are arranged in a second P-well of the N-type semiconductor substrate, the first P-well and the second P-well are positioned separately from each other,
an N-well is arranged in the first P-well, and
an N-well is arranged in the second P-well.

8. A camera comprising:
a solid-state image sensor according to claim 1; and
a processor that processes signals output from the solid-state image sensor.

* * * * *